United States Patent [19]

Ondis et al.

[11] 4,119,974
[45] Oct. 10, 1978

[54] RECORDING DEVICE

[75] Inventors: Albert W. Ondis, North Kingstown; Everett V. Pizzuti, Exeter, both of R.I.; Eugene F. Martha, North Attleboro, Mass.

[73] Assignee: Atlan-Tol Industries, Inc., West Warwick, R.I.

[21] Appl. No.: 760,234

[22] Filed: Jan. 17, 1977

[51] Int. Cl.² .............................................. G01D 15/28
[52] U.S. Cl. ................................. 346/145; 346/76 R
[58] Field of Search ................ 346/76 R, 68, 136, 145

[56] References Cited

U.S. PATENT DOCUMENTS

| | | | |
|---|---|---|---|
| 2,510,575 | 6/1950 | Hathaway | 346/145 |
| 2,669,501 | 2/1954 | Young et al. | 346/68 |
| 3,389,402 | 6/1968 | Rosmanith | 346/76 |
| 3,754,279 | 8/1973 | Valenti | 346/76 R |
| 3,975,742 | 8/1976 | Kelley | 346/76 R |
| 4,017,868 | 4/1977 | Keating | 346/61 |

*Primary Examiner*—Joseph W. Hartary
*Attorney, Agent, or Firm*—Salter & Michaelson

[57] ABSTRACT

A recording device for recording information from a remote source on a continuously moving material sheet including an improved printing head construction for printing indicia and other characters thereon for identifying such information. The recording device also includes a novel mechanism for supporting and disposing the sheet initially in a storage or rest position through and to a position wherein such sheet is in operative contact with essential portions of the device including printing means, recording means, and means for advancing the sheet through such device.

17 Claims, 12 Drawing Figures

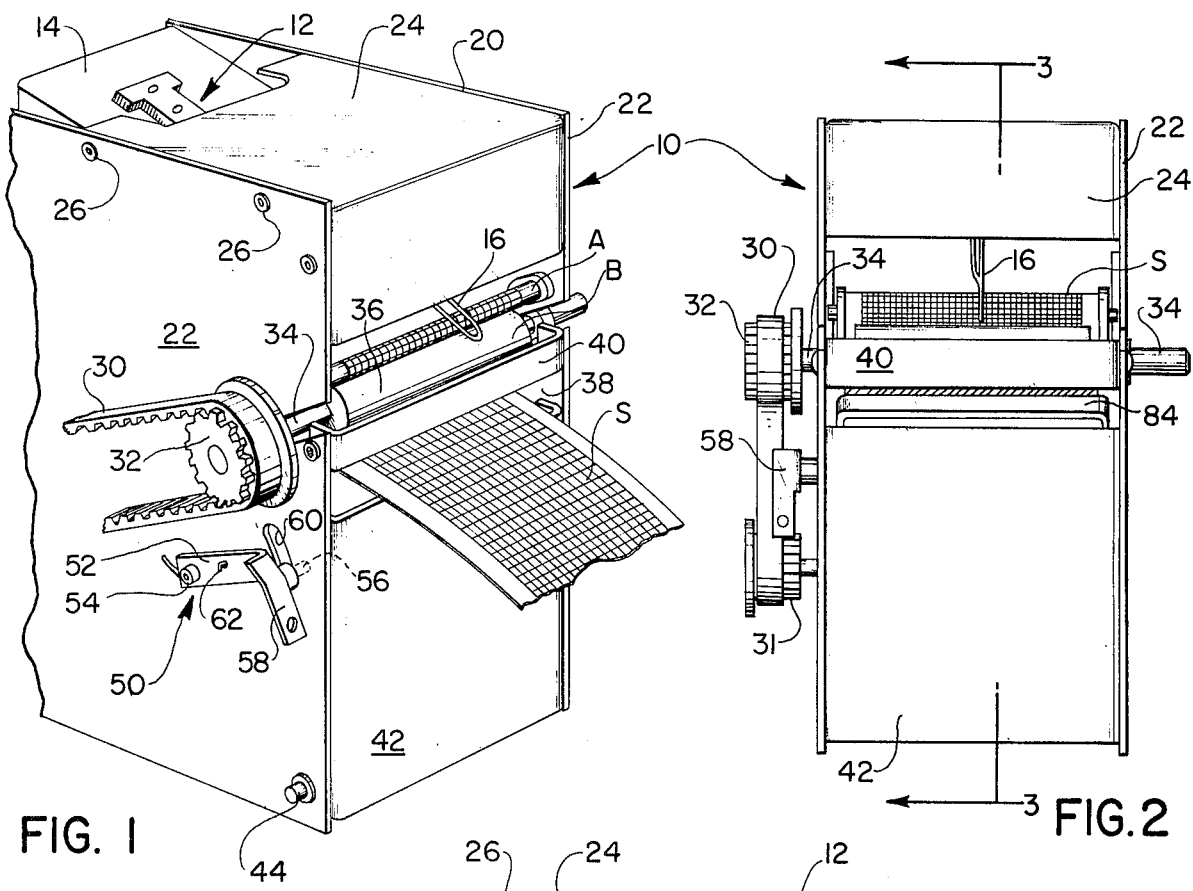
FIG. 1
FIG. 2
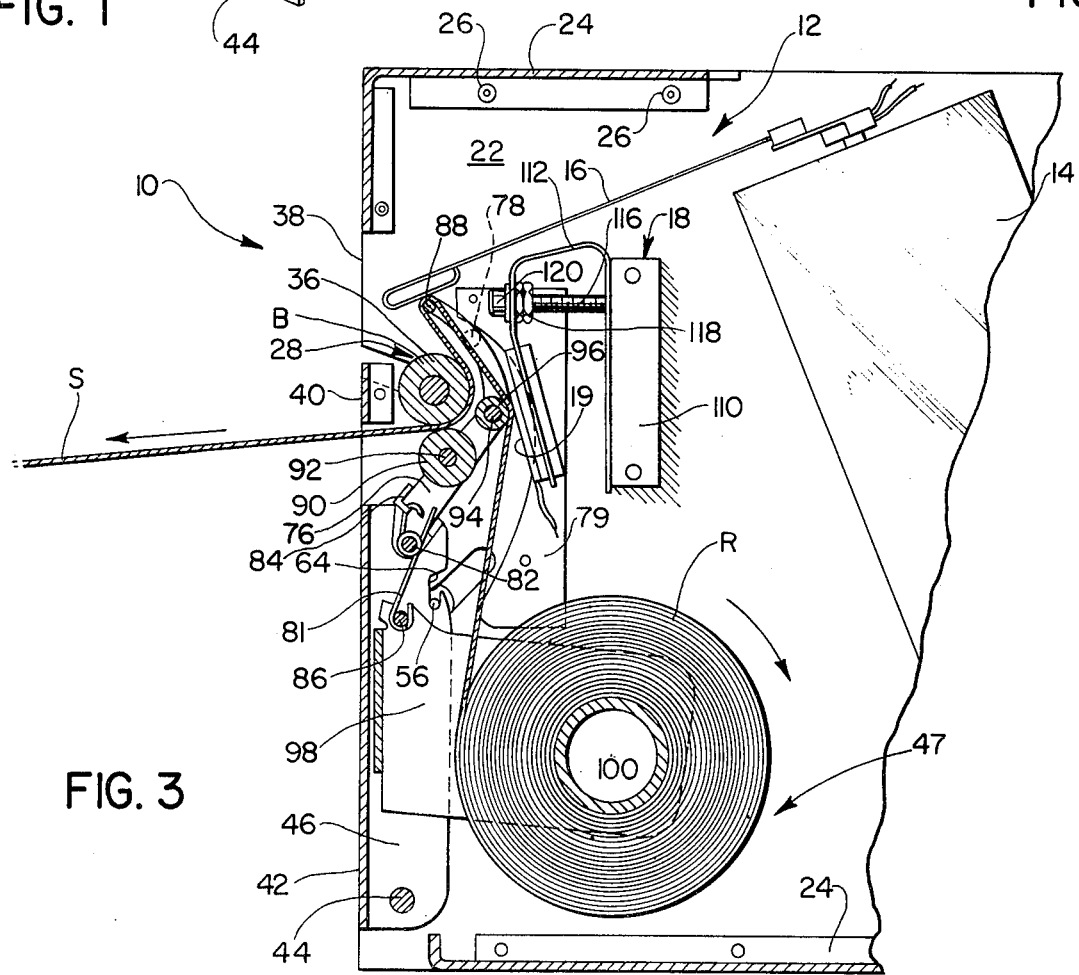
FIG. 3

FIG. 9
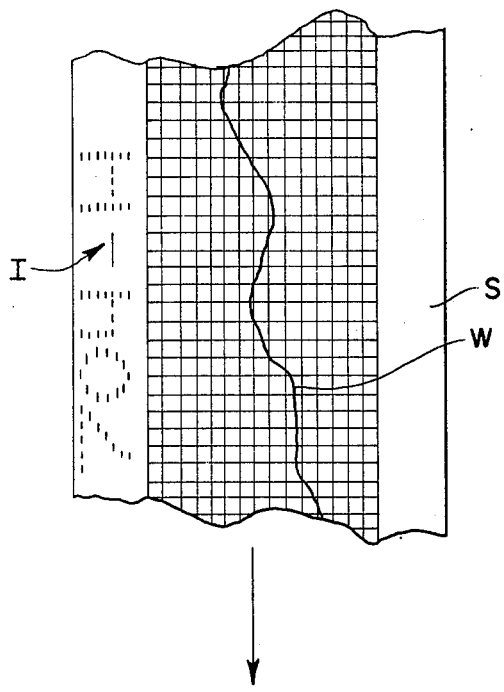
FIG. 10
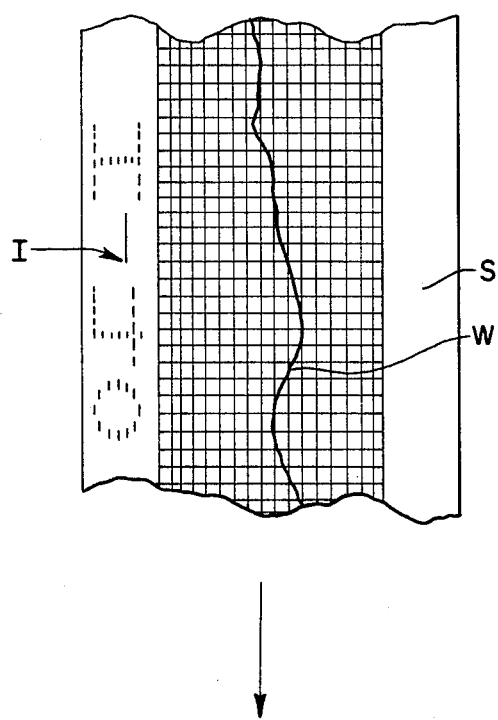
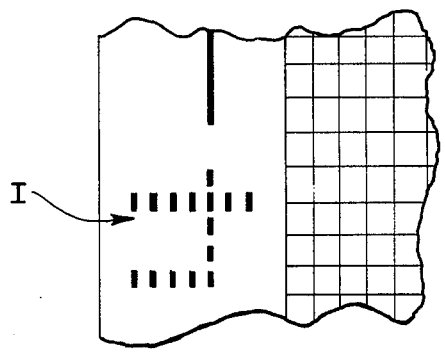
FIG. 9A
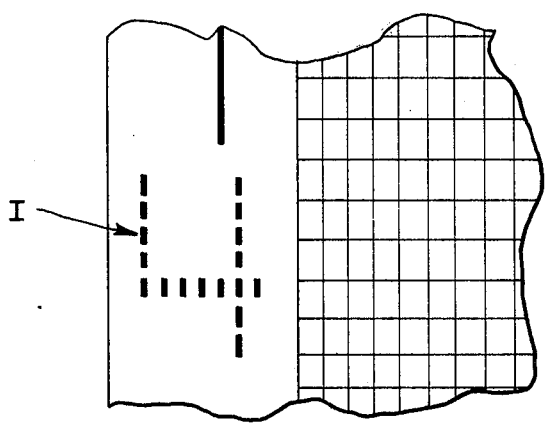
FIG. 10A

RECORDING DEVICE

BACKGROUND AND SUMMARY OF THE INVENTION

The present invention relates to a graphic recording device that incorporates a variable speed thermo-responsive sheet material wherein any character including selected alpha-numeric or scientific characters are imprinted on the sheet material thermographically. The characters may be either read and interpreted directly or by further machine processing. In variations of the device, with appropriate changes, other type responsive sheets; i.e., an electro-sensitive or electro-graphic sheet may be utilized in place of the thermo-sensitive recording sheet. Generally, sensitized chart paper in roll form is utilized, however, other sheet form materials such as cloth, plastic, etc. can also be used.

This present invention has particular application in analog recorders incorporating variable speed chart records made on thermo-sensitive sheet material, which may be used to monitor continuously changing physiological information such as electrocardiography (ECG), electroencephalography (EEG), blood pressure, inter-ocular pressure, or scientific data such as ph, voltage, current, etc.

In such cases it is not only necessary to identify the patient from whom such data is being taken where many patients are being monitored, but, increasingly, sophisticated diagnoses of the continuously varying data are being made by computer and fed back to the analog recorder. In such instances, the analog channel, or channels, of the recorder display the continuously changing data, such as ECG, in the classical wave form manner for conventional analysis by those skilled in the art, while one or more printer channels utilizing the instant invention can receive simultaneous computer analysis in alpha-numeric form which would be printed out on the same thermo-responsive sheet, adjacent to the analog data, much like a conventional tele-type-writer, thereby enhacing a diagnosis of patient condition.

Because different physiological data, and other scientific data are recorded at different chart speeds, it is important that the fixed print head be capable of imprinting alpha-numeric and other characters on the sheet as the sheet moves in operative contact therewith at such varying sheet speeds, without blurring the characters or without elaborate prior adjustment to prevent such blurring. In previous devices, characters were imprinted on analog recorder charts by mechanical print heads which used carbon paper or typewriter style ribbons, or inking pads. Others utilized thermo-responsive papers in combination with segmented printer heads. In the case of segmented print heads the characters are formed when horizontal and vertical elements or bars, usually seven in number, are arranged in a matrix or mosaic pattern so that by selectively energizing, i.e. heating, one or more of the bars in such matrix, an identifying mark will occur at that location on the thermo-responsive sheet where such bar physically or operatively contacts the sheet. The mark will accordingly be an exact size and shape reproduction of the mosaic or matrix pattern of the energized bar or bars. An example of such a segmented mosaic or matrix type print head is disclosed in U.S. Pat. No. 3,754,279 dated Aug. 21, 1973.

As can be readily seen, the number and variety of characters that can be formed by such known segmented bar systems is limited. For example the letter "X", the asterisk, the symbols for parentheses, commas, slant lines, accent marks, question marks or scientific symbols, or reproductions of analog data either cannot be formed at all or cannot be readily formed. Also, upper and lower case designations of the same letters cannot be conveniently formed with a single matrix pattern print head. Attempts have been accordingly made to improve both the range of characters printable by such matrix type segmented print heads as, for example, by superimposing layers of segment print heads over each other wherein the bars from one layer overlap other layers thereby avoiding the gaps which are characteristic of segment print heads. Despite these improvements, an unlimited range of characters and reproductions of analog data cannot be formed even with such improved matrix type print heads. A need thus exists for a print head so constructed as to enable expanded and more versatile printing within the above indicated environment.

Additionally, recording devices of the above discussed type require an advancing means most generally in the form of friction-related drive rolls to advance a supply of sheet material, normally in roll form, from a storage position through the device. Such advancing means may thus serve to move the sheet past a recording stylus in turn movable transversely across the sheet in response to varying electrical impulses from an interconnected galvanometer, and past a printing head which effects the printing of indicia identifying the above indicated information transferred to the sheet. A convenient mechanism for thus storing such sheet material in roll form within the device but making such readily available for replenishment would be desirable.

Furthermore, devices of this nature normally include a bar or knife edge transversely disposed to the longitudinal path of sheet travel so that when information from a particular patient or the like has been concluded, the relevant portion of the sheet may be torn from the supply for analysis or for reference filing with a patient's records. Also, inasmuch as devices of this nature may require that the sheet assume a plurality of transverse bends of a rather complicated nature so as to insure passage past the essential functional portions of the device in the proper attitude within an essentially limited space, it would be desirable to provide a mechanism for supporting and disposing such sheet material initially from a storage or nonoperative position through intermediate positions and into an active or operative position automatically and without the necessity of requiring the operator or observer of the device to consume the time that would be necessary to hand thread such sheet material.

Accordingly, a primary object of the present invention is the provision of a printing head of straightforward simple construction for use in an information recording device of the aforementioned type and wherein an unlimited number of characters including those incapable of being formed by segmented matrix type print heads, are formable.

A further object of the invention is the provision of a print head which includes a series of spaced segments or elements aligned in transverse disposition to the path of sheet travel so that activation of one or selected numbers of such segments can be utilized to alternately form either discrete separated marks or continuing lines on such sheet surface dependent on the activation dwell time of such segment or segments.

A still further object of the present invention is the provision of a printing head for use in information recording devices of the aforementioned type in which a plurality of separate, spaced segments or elements thereof are disposed with regard to the sheet material so that the regulation of the speed of travel of such sheet material past such print head may be utilized to regulate one of the major dimensions of the characters formed thereby.

A further object of the invention is the provision of a method of the immediately aforementioned type wherein the sequential activation of a plurality of spaced mark-forming segments disposed transversely of the path of sheet travel serves to regulate one major dimension of the characters so formed and the speed of travel of such sheet in combination with the activation interval of such segments provides the remaining major dimension to such characters.

A still further object of the invention is the provision of a device of the aforementioned type which will provide individual marks on a traveling sheet of material which will not be blurred.

Another primary object of the present invention is the provision of a novel and convenient mechanism for automatically positioning a running length of sheet material in simultaneous operative contact with the information recording means of a device of the aforementioned type.

A still further object of the invention is the provision of a sheet handling mechanism which incorporates a supply of such material in a member adapted for pivotal movement in relationship to the remaining portions of the device so that a running length of such sheet material may be automatically supported and guided through a tortuous path and automatically placed in operative association with the advancing means, the recording means, and the printing means of a device of the aforementioned type.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a partial perspective view of a recording device wherein information from a remote source is recorded on a continuously moving sheet;

FIG. 2 is a front elevational view thereof;

FIG. 3 is a side sectional view taken along the line 3—3 of FIG. 2 and shows in particular the relationship of the sheet material to the varying functioning portions of the device when in operative position;

FIG. 9 is an enlarged view of a sheet similar to that shown in FIG. 8 showing how letters, figures or other indicia may be formed on a sheet so as to be readable thereacross;

FIG. 9A is an even further enlargement thereof to better show how individual segments may interrelate to so form such indicia;

FIG. 10 is an enlarged view of a portion of sheets showing how indicia readable in the direction of travel of such sheet may be formed; and FIG. 10A is an even further enlargement of indicia formed in FIG. 10 to better show how individual marking segments may interrelate to form such indicia.

DESCRIPTION OF THE INVENTION

Figure 5:
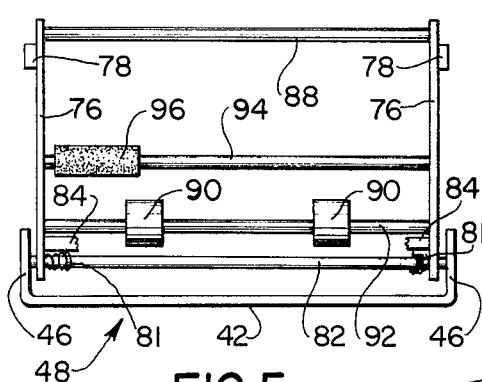
FIG. 5 is a partial front view of the device in the open position shown in FIG. 4 and showing in particular the relationship of the various portions of the sheet positioning means to each other.

Referring now to the drawings, a recording device 10 is illustrated. Such device serves to record information from a remote location and includes a recording station 12 having one or more analog recording elements or channels to record wave forms W (see FIG. 8) in visible form upon a sheet of continuously moving material. The sheet S is of known sensitized types which will produce visible markings when exposed to a source of heat, i.e., thermo-responsive, or a source of electrical energy, i.e., electro-responsive. Such sheet materials are known and their particular selection forms no part of the present invention except as a means for supplying information from a remote source upon the sensitized sheet as it passes by a recording station including one or more recording elements such as the stylus 16 depicted. Such stylus is responsive to the output of the galvanometer 14 in such a manner so as to record information, such as the condition of a hospital patient, upon the sheet S. In this manner information from several sources may be channeled into a central viewing or analysis area, i.e., several hospital patients may be monitored at a common station and accordingly provide better and more efficient control thereover. Since information from plural recording sources may be recorded on the device at different times or are simultaneously recorded on a plurality of devices, it is imperative that indicia I (see FIG. 8) identifying such information be recorded on the sheet adjacent such information so that, for example, the particular condition of a patient being monitored may be clearly identified by parameters such as time, patient, and location.

A print station 18 is provided to provide such identifying markings. This print station 18 includes a novel print head 19 configuration which enables such to print a wide variety of indicia hitherto before unable to be formed and at varying sheet speeds without incurring blurring. The structure and operational manner which affords such results will hereinafter be more fully disclosed.

In order to support the recording station 12, the printing station 18, and other operative aspects of the device, such device includes a housing 20 having upright side plates 22 spaced apart and reinforced by upper and lower bridging members 24 suitably secured thereto as by known connection means such as the rivets 26 depicted. The housing 20 also includes a motor (not shown) or other equivalent power source for driving an advancing means 28 which in turn serves to advance the sheet S past the recording and printing stations 12, 18 respectively, at a speed which may be varied dependent on the particular information being recorded. Such advancing means 28 includes a drive belt 30 and trained over a drive roll 31 and a driven roll 32 so as to drive a shaft 34 rotatably mounted between the side plates 22. The shaft 34 is in turn provided with a roller 36 having a surface of high-friction material such as rubber and the like and adapted to frictionally engage surface portions of the sheet transversely thereacross. As best shown by reference to FIG. 3 of the drawings, the sheet S assumes a tortuous path so as to assure its operative contact with the stylus 16 of the recording station 12, the printing head 19 of the printing station 18 and thence to the advancing means 28 which serves to move a continual length of such sheet from a supply thereof, such as the roll R, outwardly thereof through the generally open front surface 38 of the housing 20. In this regard a cutting bar 40 is disposed transversely across the path of sheet travel above such sheet as it immerges from the housing so that the sheet may be upwardly torn thereacross for periodic removal at the completion of information recording intervals and the like. The cutter bar 40 may also preferably be, as depicted, mounted in front of and proximal to the drive roll 36 thus in effect forming a safety guard therefor.

Figure 4:
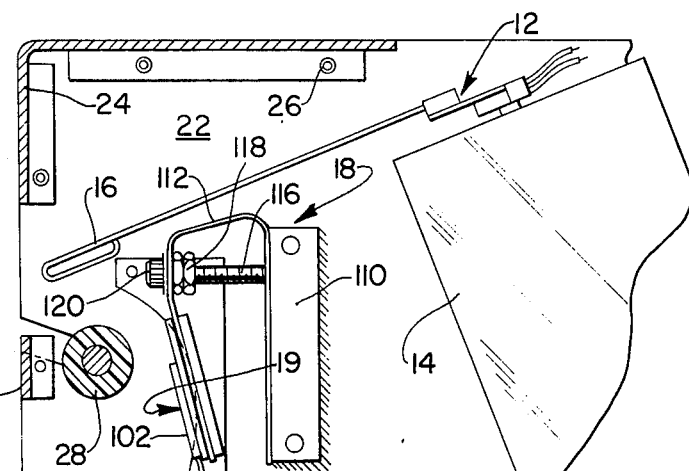
FIG. 4 is a side sectional view similar to FIG. 3 but showing the device in an open, nonoperative position such as would be utilized to change a sheet roll or for repair, etc.
Figure 7:
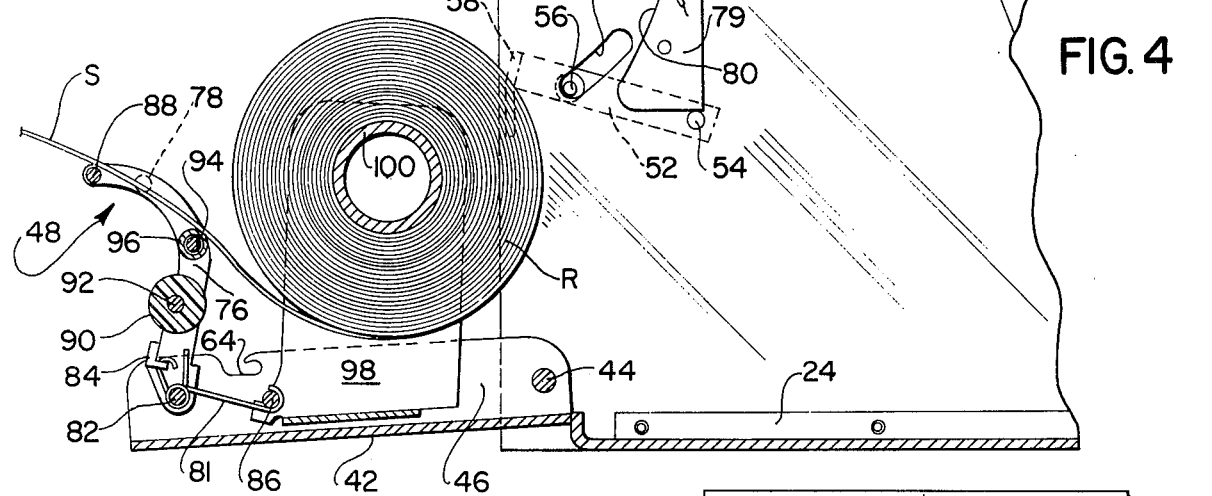
FIG. 7 is an enlarged view of a portion of the printing head of the present invention shown in plan and particularly illustrating the electrical connections made thereto in order to permit separate and sequential activation of the individual marking segments thereof.
Figure 6:
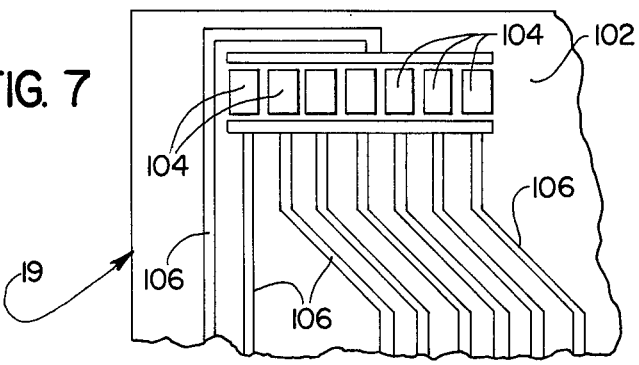
FIG. 6 is a partial perspective view on an enlarged scale of the printing head of the present invention showing its relationship to the recording sheet in operational contact therewith.
Figure 6:
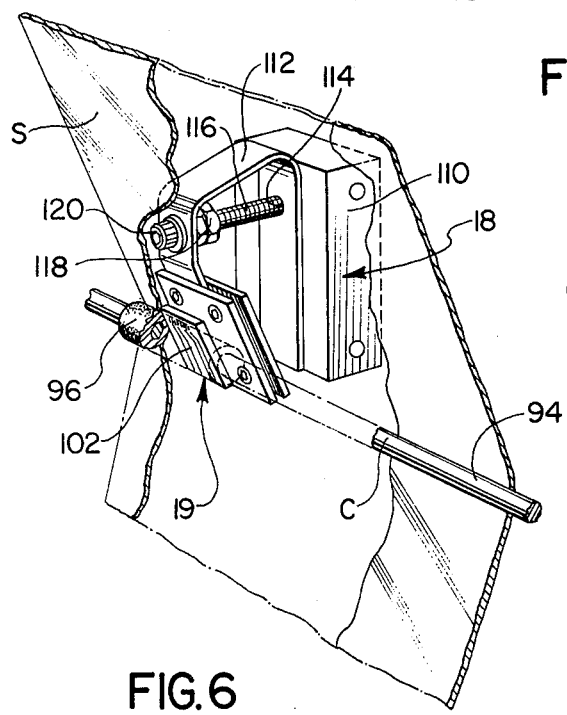

The manner and structure by which the sheet is placed in its desired travel path will now be explained by simultaneous reference to FIGS. 3 through 5 of the drawings wherein a door or member 42 is mounted with respect to the sidewalls 22 for pivotal motion therewith from an open or nonoperative position, as depicted in FIG. 4 of the drawings, to a closed operative position as shown in FIG. 3, as by opposed pins 44 passing through the sidewalls 22 and flanges 46 disposed on both sides of such door. The door 42 is further provided with a storage means 47 for the roll R of sheet material and a subassembly 48 which, as will hereinafter be more clearly brought out, serves to simultaneously support and dispose the sheet into its desired operative travel path when the door 42 is moved from its open to its closed position. Mounted on the housing 20 and projecting through a sidewall 22 thereof and adapted for cooperation with the door 42 to secure such in its closed operative position, is a latch mechanism 50 comprising a lever 52 pivotally attached through pin 54 to the sidewall 22. Such lever 52 is provided at its opposite end with an inwardly directed pin 56 and an outwardly directed finger engaging element 58. The terminal end and accordingly the pin 56 is adapted for arcuate movement within the confines of a slot 60 formed within the sidewall 22 and is urged downwardly by means of a spring 62. The flange 46 of the door 42 proximal such latch means 50 is provided with an undercut opening 64 in turn adapted to receive the pin 56 and accordingly serves to lock the door 42 in its closed operative position as depicted in FIG. 3 of the drawings. When it is desired to open the door, as for replenishment of a roll R of sheet material or for repair and the like, the lever 58 may be moved upwardly to release the locking relationship of the pin 56 in the opening 64.

Turning now to the sheet positioning subassembly 48, such includes a pair of upright arms or segments 76. Such arms are preferably arcuately shaped, as depicted in FIG. 4, and provided with cam extensions 78 projecting outwardly form the sides thereof, preferably towards the forward terminal portions for cooperative engagement with a pair of cam tracks 79 each having a cam engaging surface 80 fixedly positioned on the interior wall surfaces of the sidewalls 22. The other ends of the arms 76 are pivotally connected as at 82 to the upper portions of the door 42 and are spring urged towards interior portions of the door against stop means (not shown) but which may be conveniently provided on the inside of the flange 46. In turn, the spring 81 may be either directly connected to each arm 76 or to a bar 82 extending therebetween. Opposed ends of the spring 81 may further be connected to secondary bars 84 and 86, bar 84 being disposed between the arms 76 and bar 86 between the flanges 46 of the door 42. In this manner then the sheet positioning subassembly 48 is continually spring urged arcuately to the right, as depicted in FIG. 4 of the drawings, about its pivotal connection with the door as provided through bar 82. At the same time, however, it should be clear that the entire sheet positioning subassembly 48 is free to arcuately move to the left against such spring action when forced in such attitude by the coaction between the cams 78 and the cam track 80 until the full pivotal travel motion of the door 42 is accomplished.

The sheet positioning subassembly 48 is further provided with a first segment or transversely extending bar 88 which serves as a support for the sheet material S when in the open position and which additionally serves to upwardly direct the sheet into the desired travel path when the door is pivotally swung to its closed operative position. Thus it may be seen that the cooperation of the cam action forcing the subassembly 48 upwardly along the path of the cam engaging surface 80, against the action of the spring 81, and the independent upward pivotal movement of the door 42 enables the first segment or bar 88 to position the sheet S in operative contact with the stylus 16, as depicted in FIG. 3, in a position above and substantially in vertical alignment with the drive roll 36. A second segment 90 which includes spaced discs or rolls freely rotatable about a bar 92 in turn supported between arms 76 at a position more proximal to the pivotal connection between the door and the arm 76 is also included. Such segment 90 is positioned to underlie advancing roller 36 and contact under portions of the sheet S so as to form a frictional support and assure the proper longitudinal advancing thereof. Although two such rolls 90, both freely rotatable about the shaft 92 are depicted, it should be clear that a single continuous sheet contacting roll may alternatively be utilized.

Disposed between the first segment 88, which serves to position the sheet against the recording station 12, and the second segment or disc rollers 90, which serve to position the sheet against the advancing means 28, is a third segment or bar 94 also spanning and interconnected between the spaced arms 76. Such bar or shaft 94 includes a segmented roller 96 having an outer surface of a frictional material, such as rubber and the like, similar to that which may be provided on the drive roll 36 and which serves to yieldably urge the surface of the sheet S to be printed with information identifying indicia or characters, into operational contact with the printing head 19 of the print station 18. Generally it is preferable that roller 96 yieldably force the sheet S into direct contact with print head 19; however, with some types of sheet activation mechanisms it may be possible for the roller 96 to support the sheet at some finite distance from the print head so long as operational results are obtained.

It should thus be apparent that these actions of supporting and positioning the sheet S are accomplished simultaneously with the closing pivotal motion of the door 42 in combination with the independent upward outward swing of the sheet positioning subassembly in turn being controlled by the coaction of the cam 78 with the cam track 80. It will therefore be seen that the sheet material is at all times supported; initially in the open position of the door wherein the sheet positioning subassembly 48 is in an upright position by the simultaneously resting contact with bars 88 and 94, and by contact with the rollers 90 just prior to final closing of door 42. Thus, when the door 42 is swung from the open position illustrated in FIG. 4 to the closed position illustrated in FIG. 3, the sheet automatically assumes the tortuous path illustrated in FIG. 3 with roller 96 holding the sheet against or closely adjacent to printer head 19 and with bar 88 holding the sheet in contact with stylus 16. In this way complicated and difficult threading of the sheet is entirely eliminated.

As previously indicated, the door 42 is further provided with a sheet storage means 47 including a pair of ears 98 disposed slightly inwardly of the upstanding flanges 46 and adapted for at least limited counterclockwise pivotal movement, as depicted in FIG. 4, about secondary bar 86; such action enabling the ears 98 and roll R to be swung forwardly to some degree when door 42 is open, thus affording somewhat better access when it is desired to mount or remove the roll of sheet material. Each ear 98 in turn is provided with means (not shown) for supporting the ends of a tube 100 or other support device for supporting the roll R and enabling such to freely rotate thereon as a running length of sheet S is removed therefrom.

Figure 8:
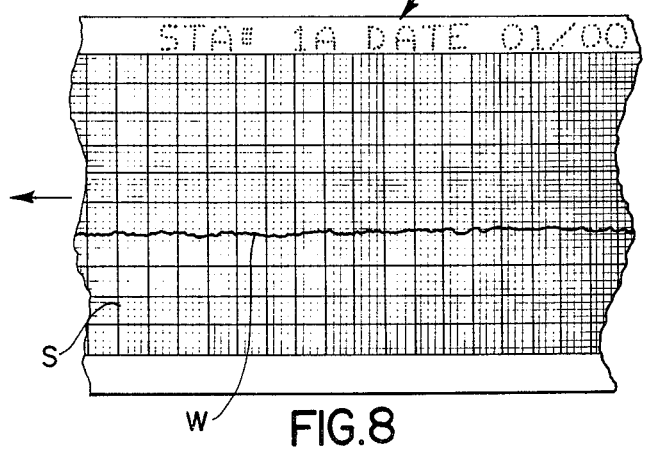
FIG. 8 is a view illustrating one manner in which the present device may be utilized to form identifying characters on a sheet of moving material so as to identify information recorded thereon.

Turning now to the printing station 18, the construction of the printing head 19 which enables the improved printing results of the present invention will be explained. Each of such print heads 19, as in some cases it may be necessary or desirable to utilize more than one, are provided with a plurality, usually seven but fewer or more may be used, of resistor points, segments, or pads 104 arranged in a row or path generally disposed in a transverse attitude with the path of sheet material travel. Preferably, such transverse path is normal or perpendicular thereto for conservation of space within the printing head 102 however, varying diagonal attitudes may be utilized so long as each element 104 is separated from the other transversely across the longitudinal path of sheet material travel. When sheet material of a thermo-responsive nature is utilized, each pad or segment 104 forms a resistor so that electrical energy directed thereto, as by means of separate conducting paths 106, serves to momentarily heat such segment and accordingly cause a mark to be formed in the sheet material in immediate adjacent or intimate contact therewith. Inasmuch as the application of current to each such segment may be either intermittent or continuous, a series of longitudinally spaced dots or a continual line may be respectively formed on the sheet surface. Expressed differently, it will be seen that by varying the dwell time, that is, the time in which any particular segment 104 is activated, and dependent on the speed of travel of the sheet material, that either the shape of the pads or elongated forms thereof may be created. The pads 104 may be of any desired configuration, rectangular as depicted, square or round configurations being particularly desirable and are preferably equally spaced from each other a distance not substantially greater than that necessary for the observer of a series of discrete marks made by adjacent segments to visually interconnect such marks in line form. Thus activation of each segment or pad 104 simultaneously would form a series of marks on the sheet S disposed transversely thereof and accordingly dependent on the orientation of the indicia desired would form either the upright vertical dimension of a character I (See FIGS. 8, 9 and 9A) or its horizontal width (see FIGS. 10 and 10A). Thus if the characters are to be formed in vertical orientation parallel to the longitudinal directional movement of the sheet material and accordingly be visually observable transversely thereacross as depicted in FIG. 8, the simultaneous activation of one or more such segments 104 would form the height of such character, i.e., the main stems of the 4 and H shown in FIGS. 9, 9A whereas the number of times such activation is sequentially made and the dwell time thereof would determine, in conjunction with the speed of travel of the sheet material, the width or lateral dimension of the character. Solid lines such as that shown between the H and 4 in FIGS. 9, 9A may be formed by maintaining one segment in an activated state for a relatively long time period in order to let the sheet travel from a continuous mark; elongated forms of the segment shape by an intermediate activation period etc.

Alternatively however, it should be apparent that the transverse orientation of the row or series of paths may be used to form the width of the character and the longitudinal movement of the sheet providing the height thereof as in FIGS. 10 and 10A. However, the vertical character orientation which is visually readable transversely of the sheet is a more visually preferred and thus more common form although both forms are acceptable especially when considering machine scan reading thereof.

Although the above action has been described in regard to pads or segments which are resistive in nature, it should be clear that conductive pads or segments may alternatively be used in which case electro-responsive rather than thermo-responsive sheet material would be utilized. Thus with electro-responsive or electrographic recording sheets having an electro-conductive white surface coating, the printing head 19 will incorporate electrically conductive pads instead of electrically resistive pads. In such cases, a low level electrical current may be applied directly to the electrically conductive white surface of the electro-responsive recording sheet. When the recording current is applied, an electrical circuit is closed causing a "short" circuit. The low current carrying white surface of the sheet will evaporate locally at the point of the "short" circuit, instantaneously exposing a contrasting undersurface. Thus a series of unconnected "dots" may be formed with electro-responsive sheet material in a manner similar to the manner in which "dots" are formed on thermo-responsive sheet material.

It should accordingly be readily observable that by coordinating the number and activation sequence of the pads 104 that an infinite number of characters of any type may be formed with no limitations as to their configuration or their use of intersecting lines and the like.

Also as distinguished from prior art matrix orientated print head devices which necessarily must transpose the exact configuration of their shape segment to the sheet in order to provide a nonblurred recognizable character and accordingly must be coordinated to the particular speed of sheet travel, such is not the case with the present device and such is accordingly not limited in this respect. Thus, since the sheet travel is utilized to form one dimension of the characters formed and because the characters are progressively formed as through a series of intermittent activations of one or more of the segments 104 in a series thereof, the flexibility and accordingly the usefulness of the present type printing head configuration is enhanced.

In order to assure a positive contact between the printing head 19 and the sheet S, the printing station further includes a mounting block 110 having in turn a spring bar 112 to which the printing head 19 is attached. Such spring bar is movable towards and away from the sheets through an adjustment mechanism 114 including a threaded rod 116 and lock nuts 118 adapted to engage interior surface portions of the bar and held in place by means of a threaded member 120. As is known in the art, the paths 106 are mounted on an electrically nonconductive material, such as ceramic, from which the face 102 is formed and accordingly as electrical energy is transmitted by means of conductive paths 106, the segments 104 are instantaneously heated in the case of thermo-responsive sheet material and when the electrical current is removed, the pads or segments 104 will almost instantaneously cool.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for recording information in a continuously moving sheet comprising a housing having a front face opening including a lower portion of said opening, recording means supported by said housing above said lower portion of said opening, means for advancing a running length of said sheet past said recording means, sheet positioning means for positioning portions of said sheet in operative association with said recording means, said positioning means comprising a door member adapted for projection into the space defined by said lower portion of said opening, said door pivotally positioned with respect to said housing towards and away from said recording means from a first position wherein said sheet is removed from said recording means to a second operative position with respect thereto, said member including a subassembly supported thereby for independent pivotal movement with respect thereto, said subassembly having a first segment for supporting a running length of said sheet, said housing including guide means, said subassembly including means for engaging said guide means, said guide and guide engaging means adapted for mutual contact during movement of said member between said first and second positions so as to control the independent pivotal movement of said subassembly with respect thereto whereby said first segment upwardly moves a portion of said paper above said lower portion of said opening into operative association with said recording means during said independent pivotal movement of said subassembly.

2. The device set forth in claim 1, said means for advancing said sheet supported by said housing and wherein said sheet positioning means is adapted to simultaneously position said sheet into contact with said advancing means.

3. The device set forth in claim 2, said advancing means including a rotatable roller adapted for frictional driving contact with said sheet, said roller fixed in position by said housing above said lower portion of said front face opening.

4. The device set forth in claim 3, said recording means positioned generally above said advancing means and upstream thereof with respect to said running length of sheet, said subassembly including a second segment arcuately separated from said first segment and positioned proximal the pivotal axis thereof, said second segment adapted to force said sheet into contact with said advancing means when positioned in said second position.

5. The device set forth in claim 4, said door pivotally hinged with respect to said housing at bottom portions thereof, said door arcuately movable upwardly towards said recording and advancing means but to an extent short of enabling contact with said recording and advancing means in its second or operative position, said subassembly pivotally attached to upper portions of said door and in turn independently arcuately movable with respect to said door from said first position wherein said first segment thereof is adapted for generally in line and equal height positioning with respect to upper door portions in said first position to an operative position materially above said upper door portions.

6. The device set forth in claim 5, said subassembly including a pair of spaced arms, said subassembly segments comprising bars spanning said arms.

7. The device set forth in claim 6, including spring means for urging said arms inwardly downwardly against stop means adapted to position said first segment bar in an upright sheet supporting position when said door is disposed in a first position outwardly disposed of said housing.

8. The device of claim 7, said arms being arcuately shaped so that the segment bars thereof may be disposed at varying relative special relationships with respect to each other.

9. The device of claim 6, said guide means including spaced tracks supported by said housing, said arms including cam means for contact with said spaced tracks, said spring means urging said cam means against said tracks.

10. The device of claim 5, said door including a pair of spaced upwardly extending ears positioned proximal the pivotal connection of said door with said housing and adapted to receive a roll of said sheet with the running end thereof adapted for supportive positioning over said subassembly positioned forwardly thereof in said first position.

11. The device of claim 5, including cutting means spanning said opening above said door for tearing a running length of said sheet which has been advanced outwardly of said opening.

12. The device set forth in claim 2, including a print head for printing identifying indicia on said sheet, said print head supported by said housing and wherein said sheet positioning means additionally simultaneously positions portions of said sheet into operative contact with said print head.

13. The device set forth in claim 12, said print head positioned inwardly of said sheet advancing means, said subassembly including a third segment positioned intermediate said first and second segments for urging said sheet into operative contact with said print head in said second operative position.

14. The device of claim 1, said pivotal member including means for supporting a roll of said sheet.

15. The device of claim 1, including latch means for maintaining said member in said second operative position.

16. The device of claim 1, said device including printing means for printing identifying indicia on said sheet, said advancing means, said recording means and said printing means each positioned within said housing above said front opening and at different spacial relationships with respect to each other and said housing front face, said subassembly including a plurality of individual segments adapted to position portions of said sheet respectively in operative association with said recording means, said printing means and said advancing means, said segments positioned in different spacial relationships with respect to each other and with respect to said housing.

17. The device of claim 16, said subassembly comprising a pair of arcuately shaped arms spaced from each other and interconnected by means of said segments said segments in turn each comprising a laterally orientated bar.

* * * * *